US011863948B1

(12) United States Patent
Kwatra et al.

(10) Patent No.: US 11,863,948 B1
(45) Date of Patent: Jan. 2, 2024

(54) SOUND COMPONENTS RELATIONSHIP CLASSIFICATION AND RESPONSIVE SIGNAL PROCESSING IN AN ACOUSTIC SIGNAL PROCESSING SYSTEM

(71) Applicant: Cirrus Logic International Semiconductor Ltd., Edinburgh (GB)

(72) Inventors: Nitin Kwatra, Austin, TX (US); Jeffrey D. Alderson, Austin, TX (US)

(73) Assignee: Cirrus Logic International Semiconductor Ltd., Edinburgh (GB)

( * ) Notice: Subject to any disclaimer, the term of this patent is extended or adjusted under 35 U.S.C. 154(b) by 0 days.

(21) Appl. No.: 16/384,531

(22) Filed: Apr. 15, 2019

Related U.S. Application Data (60) Provisional application No. 62/658,150, filed on Apr. 16, 2018.

(51) Int. Cl.
| | |
|---|---|
| *G10K 11/178* | (2006.01) |
| *H04R 3/04* | (2006.01) |
| *G10L 21/0232* | (2013.01) |
| *G10L 15/16* | (2006.01) |
| *H04R 5/033* | (2006.01) |
| *H04R 5/04* | (2006.01) |

(52) U.S. Cl.
CPC ............... *H04R 3/04* (2013.01); *G10L 15/16* (2013.01); *G10L 21/0232* (2013.01); *H04R 5/033* (2013.01); *H04R 5/04* (2013.01); *H04R 2410/07* (2013.01); *H04R 2430/01* (2013.01)

(58) Field of Classification Search
CPC . H04R 3/04; H04R 5/04; H04R 5/033; H04R 2410/07; H04R 2430/01; G10K 11/1781; G10K 11/17821; G10K 11/17823
See application file for complete search history.

(56) References Cited

U.S. PATENT DOCUMENTS

| | | | |
|---|---|---|---|
| 5,502,688 | A | 3/1996 | Recchione et al. |
| 2006/0140416 | A1* | 6/2006 | Berg ....................... A61F 11/12 381/72 |
| 2013/0243214 | A1* | 9/2013 | Penketh ........... G10K 11/17885 381/71.6 |
| 2016/0343385 | A1 | 11/2016 | Hetherington et al. |
| 2017/0148428 | A1* | 5/2017 | Thuy ................ G10K 11/17861 |
| 2019/0356991 | A1* | 11/2019 | Farver .................. H04R 25/505 |

\* cited by examiner

*Primary Examiner* — Ping Lee
(74) *Attorney, Agent, or Firm* — Kent B. Chambers; Terrile, Cannatti & Chambers, LLP (57) ABSTRACT

An acoustic signal processing system and method includes classification technology to classify a relationship between at least two sound components of a received sound signal. The exemplary sound components are ambient noise and localized noise. The classification technology dynamically determines a classification value that represents the relationship between the sound components and processes the sound signal in accordance with the acoustic signal classification to modify the sound signal. In at least one embodiment, dynamic classification of the relationship between sound components in a sound signal and responsive signal processing improve performance of systems, such as an active noise cancellation (ANC) system, by, for example, attenuating at least one of the sound components and/or enhancing at least one of the sound components. In an ANC system context, the sound components generally include noise components such as ambient noise and noise localized to a microphone.

39 Claims, 10 Drawing Sheets

|  | LOCALIZED NOISE VOLUME | | | |
|---|---|---|---|---|
| AMBIENT NOISE VOLUME | ZERO | LOW | MEDIUM | HIGH |
| ZERO | 0 | 2 | 3 | 3 |
| LOW | 0 | 1 | 2 | 3 |
| MEDIUM | 0 | 1 | 1 | 2 |
| HIGH | 0 | 0 | 1 | 2 |

SOUND COMPONENTS RELATIONSHIP CLASSIFICATION AND RESPONSIVE SIGNAL PROCESSING IN AN ACOUSTIC SIGNAL PROCESSING SYSTEM

CROSS-REFERENCE TO RELATED APPLICATION

This application claims the benefit under 35 U.S.C. § 119(e) and 37 C.F.R. § 1.78 of U.S. Provisional Application No. 62/658,150, filed Apr. 16, 2018, and entitled "Wind Noise Classification and Suppression in an Active Noise Cancellation (ANC) System," which is incorporated by reference in its entirety.

BACKGROUND

Field of the Invention

The present invention relates in general to the field of electronics, and more specifically to sound components relationship classification and responsive processing in an acoustic signal processing system.

Description of the Related Art

Sound is the sensation of the human ear to waves that travel through a medium in the form of variations of pressure over time. The human ear is sensitive to 'sound waves' in a frequency range of about 20-20,000 Hz. Acoustic noise represents unwanted sound, such as sound considered to be unpleasant or otherwise disruptive. The sources and characteristics of acoustic noise are virtually limitless and can be context specific. For example, when listening to a conversation, sounds like noise, such as wind noise, engine noise, and motor noise, may be disruptive by making a concurrent acoustic transmission, such as a conversation or music, difficult to hear and understand.

Many systems have been developed to reduce acoustic noise. In addition to or in lieu of passive noise reducers that generally rely on insulation to dampen the sound pressure of acoustic noise, many systems employ an active noise cancellation (ANC) system. ANC is also commonly referred to as active noise reduction or active noise control. The ANC system actively generates "anti-noise" acoustic pressure waves to destructively interfere with the noise acoustic waves, which, thus, cancel the noise acoustic waves. An ANC system generates anti-noise acoustic waves out-of-phase with the noise acoustic waves.

Figure 1:
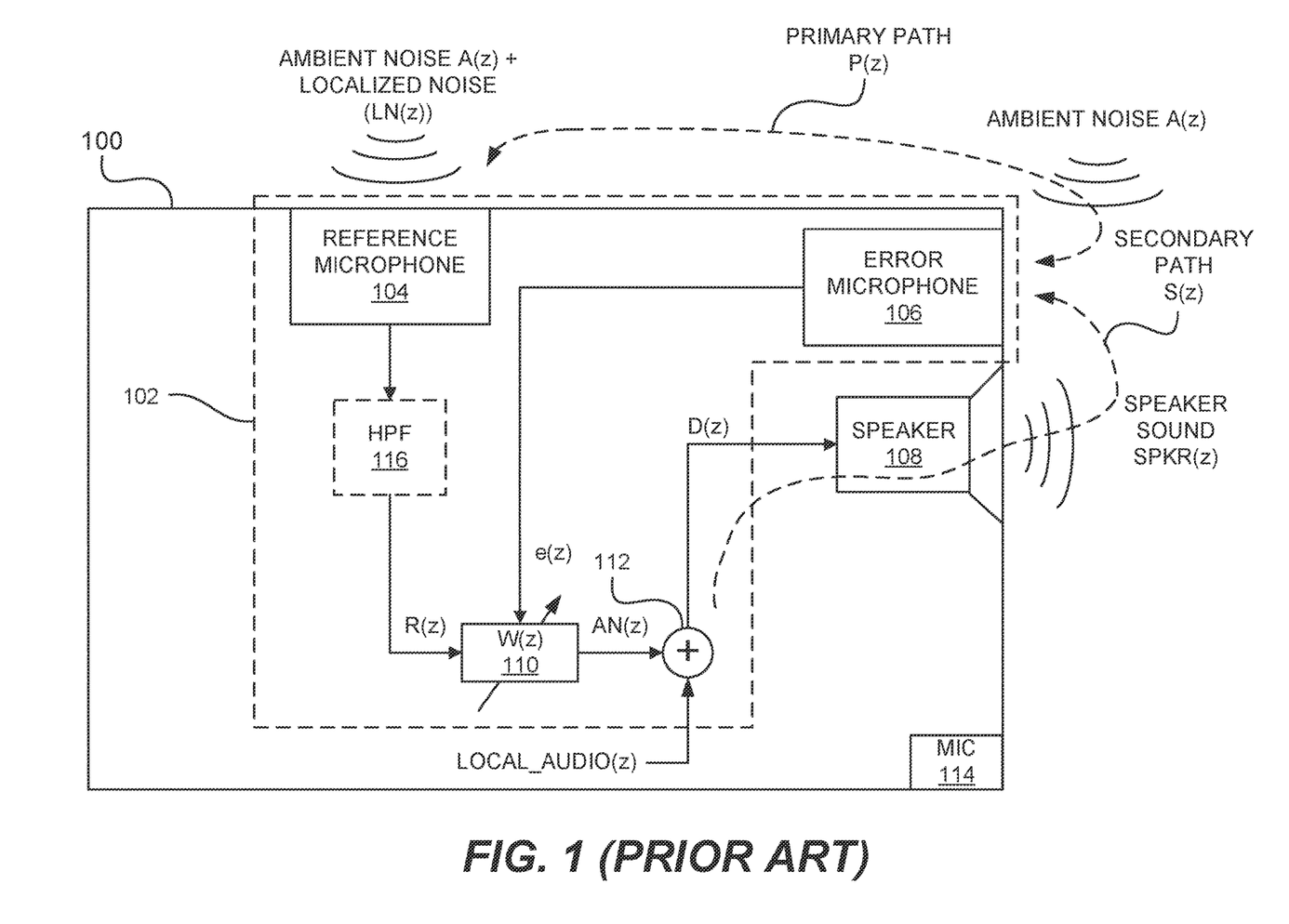
FIG. 1 (labeled prior art) depicts an audio enabled device that includes an active noise cancellation system.

FIG. 1 (labeled prior art) depicts an audio enabled device 100 that includes an ANC system 102 to at least attempt to cancel out the ambient noise $A(z) \cdot P(z)$ heard at the error microphone 106 location. Ambient noise $A(z)$ represents relatively steady state noise over a period of time in the surroundings of the audio enabled device 100. Exemplary ambient noise $A(z)$ is mechanically generated noise such as engine noise, motor noise, and other background noise that is not the acoustic signal of interest to a user of the audio enabled device 100. The ANC system 102 includes two microphones, reference microphone 104 and error microphone 106. The reference microphone 104 detects the ambient noise $A(z)$ and localized noise $LN(z)$. The reference microphone 104 is generally located away from the typical position of a sound source, such as a user's mouth, to reduce distortion of the ambient noise $A(z)$ at the reference microphone 104. However, the location of the reference microphone 104 also makes the reference microphone 104 susceptible to detecting localized noise $LN(z)$ that is not detected by the error microphone 106. The ANC system 102 generally positions the error microphone 106 proximate to an anticipated location of an ear of a user of the device 100 to particularly detect the speaker sound $SPKR(z)$ in the secondary path $S(z)$ and the ambient noise $A(z) \cdot P(z)$. The speaker sound $SPKR(z)$ is the desired acoustic signal that is intended to be heard by the user of the device 100. In at least one embodiment, the primary path $P(z)$ is a transfer function that represents the sound path of the ambient noise $A(z)$ at the reference microphone 104 $A(z)$ to the error microphone 106. In at least one embodiment, the secondary path $S(z)$ is an electro-acoustic transfer function that represents the sound path from the speaker 108 to the error microphone 106 and internal operations of the device 100 that affect the speaker sound $SPKR(z)$, such as analog-to-digital converters, digital-to-analog converters, filters, and the response of speaker 108.

The reference microphone 104 is a transducer that converts the sound detected by the reference microphone 104 including the ambient noise $A(z)$ and any localized noise $LN(z)$ into an electronic reference microphone output signal $R(z)$. An adaptive filter 110 ideally has a transfer function $W(z)=-P(z)/S(z)$ to process the reference signal $R(z)$ and the error signal $e(z)$. The adaptive filter 110 generates an anti-noise signal $AN(z)$. The error microphone 106 provides error signal $e(z)$. The signal at the error microphone 106 is $(LOCAL\ AUDIO(z) \cdot S(z))+(AN(z)+A(z) \cdot P(z))$. Audio source combiner 112 combines the anti-noise signal $AN(z)$ with a $LOCAL\_AUDIO(z)$ signal to generate a speaker drive signal $D(z)$. The $LOCAL\_AUDIO(z)$ signal may be, for example, recorded audio, such as music, or a voice signal from an optional voice microphone (MIC) 114. The speaker 108 converts the speaker drive signal $D(z)$ into the speaker sound $SPKR(z)$. In the absence of localized noise $LN(z)$, $AN(z)$ is the opposite of $A(z) \cdot P(z)$, and the ANC system 102 can generally correctly approximate the anti-noise signal $AN(z)$ to destructively interfere with the ambient noise $A(z)$. Thus, ideally the anti-noise signal $AN(z)$ component of the speaker drive signal $D(z)$ causes the speaker sound $SPKR(z)$ exiting the speaker 108 to cancel the ambient noise $A(z) \cdot P(z)$ at the error microphone 106. The destructive interference ideally cancels the ambient noise $A(z) \cdot P(z)$ at a target location, such as at an ear drum reference point or other designated point.

However, the reference microphone 104 also detects the localized noise $LN(z)$, such as wind noise, that is localized to the reference microphone 104 and, thus, not detected or minimally detected by the error microphone 106. With localized noise $LN(z)$ detected by the reference microphone 104, the anti-noise signal $AN(z)$ is $[A(z)+LN(z)] \cdot W(z)$. Thus, $AN(z)$ is no longer equal to $A(z) \cdot P(z)$. With the presence of unwanted $LN(z) \cdot W(z)$ terms in the errant anti-noise signal $AN(z)$, the additional, localized noise $LN(z)$ causes a degradation in performance of the ANC system 102 and can actually increase acoustic noise in the speaker sound $SPKR(z)$ output of speaker 108, which can be very undesirable to a user-listener of the audio-enabled device 100 especially when the user-listener is expecting a reduction in acoustic noise.

Conventional systems address the problem of localized noise $LN(z)$ in the reference microphone output signal $R(z)$ by detecting the localized noise $LN(z)$ and shutting off or muting the ANC system 102. Shutting off or muting the ANC system 102 eliminates the deleterious effects of the errant anti-noise signal component $AN(z)$. However, the benefits of the ANC system 102 in controlling the acoustic noise A(z) are lost. Some conventional systems also employ an optional high pass filter (HPF) 116 at the output of the reference microphone 104 that constantly provides high pass filtering of the reference microphone output signal R(z). However, the high pass filter 116 can be detrimental to the performance of the ANC system 102.

SUMMARY

In at least one embodiment, an exemplary method for classifying noise and responsive signal processing in an acoustic signal processing system of an acoustic system includes receiving a sound signal, wherein the sound signal includes a first sound component and a second sound component. The exemplary embodiment of the method also includes classifying, into an acoustic signal classification, a relationship between the first and second sound components, wherein the acoustic signal classification is selected from at least three classification values representing the relationship between the first and second sound components. The exemplary embodiment of the method further includes processing the sound signal in accordance with the acoustic signal classification to modify the received sound signal and providing at least the processed sound signal to a device.

In at least one embodiment, an exemplary apparatus includes an input to receive a sound signal, wherein the sound signal includes a first sound component and a second sound component. The exemplary apparatus also includes a classifier, coupled to the input, to classify, into an acoustic signal classification, a relationship between the first and second sound components, wherein the acoustic signal classification is selected from at least three classification values representing the relationship between the first and second sound components. The exemplary apparatus further includes a signal processor, coupled to the classifier, to process the sound signal in accordance with the acoustic signal classification to modify the detected sound signal and an output, coupled to the signal processor, to provide at least the processed sound signal to a device.

In at least one embodiment, an exemplary mobile communication device includes a microphone to receive a sound signal, wherein the sound signal includes a first sound component and a second sound component. The exemplary apparatus also includes an active noise cancellation system. The active noise cancellation system includes a classifier, coupled to the input, to classify, into an acoustic signal classification, a relationship between the first and second sound components, wherein the acoustic signal classification is selected from at least three classification values representing the relationship between the first and second sound components. The active noise classification system also includes a signal processor, coupled to the classifier, to process the sound signal in accordance with the acoustic signal classification to modify the detected sound signal and generate an anti-noise signal corresponding to the modified sound signal. The active noise classification system further includes a speaker, coupled to the active noise cancellation system, to receive the anti-noise signal and generate sound that corresponds to at least the anti-noise signal.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An acoustic signal processing system and method includes classification technology to classify a relationship between at least two sound components of a received sound signal. The sound components can be any type of sound, such as ambient noise and localized noise, such as wind noise. The classification technology dynamically determines a classification value that represents the relationship between the sound components and processes the sound signal in accordance with the acoustic signal classification to modify the sound signal. In at least one embodiment, dynamic classification of the relationship between sound components in a sound signal and responsive signal processing improve performance of systems, such as an active noise cancellation (ANC) system, by, for example, attenuating at least one of the sound components and/or enhancing at least one of the sound components. In an ANC system context, the sound components generally include noise components such as ambient noise and noise localized to a microphone.

In at least one embodiment, the acoustic signal processing system includes an ANC system. A typical ANC system includes a first microphone, generally referred to as a reference microphone, and may include an optional second microphone, generally referred to as an error microphone. Localized noise, such as wind noise, detected by the reference microphone is not heard by a listener. When the ANC system includes an error microphone, the localized noise is not present or has a very reduced volume at the error microphone. The absence of localized noise at the error microphone results in an asymmetry between the acoustic noise signals detected by the reference and error microphones. Thus, in a windy environment, the reference microphone receives an ambient acoustic noise component and a wind noise component, but the error microphone receives the ambient noise component and very little, if any, of the wind noise component. However, rather than merely shutting off the ANC system or introducing a permanent, fixed cutoff frequency, high pass filter, in at least one embodiment, the noise components relationship classification and responsive signal processing system addresses a relationship between the localized noise and the ambient noise of the acoustic noise signal rather than simply detecting a presence of the localized noise.

In at least one embodiment, the dynamic classification of the relationship between sound components in a sound signal and responsive signal processing system generates acoustic sound classification values that classify respective relationships between the sound components and then process the sound signal in accordance with the classification values. One exemplary relationship between the sound components are relative volumes. The perceived impact of a localized sound component, such as localized noise, on ANC processing by a user can depend on the relationship between the volumes of the sound components, such as the volumes of ambient noise and wind noise. For example, the dynamic classification of the relationship between sound components in a sound signal and responsive signal processing system can modify the localized sound component differently if the localized sound component volume is lower than the other sound component, such as ambient noise is high as opposed to the localized sound component volume being higher than the other sound component, such as ambient noise and the ambient noise is low. The particular gradations of classification of the relationship is a matter of design choice.

In at least one embodiment, utilizing the classification technology allows the ANC system to operate in multiple modes that respectively respond to different relationship degrees between the ambient noise and localized noise while preserving ANC performance in a plurality of the multiple operational modes. In at least one embodiment, the noise components relationship classification and responsive signal processing system modifies the wind noise component by adjusting a cutoff frequency of a high pass filter that processes the output of the reference microphone in accordance with the acoustic noise signal classification. Since wind noise frequency components are primarily in the lower, human audible frequency range, e.g. at or below 400 Hz, in at least one embodiment, the cutoff frequency is set between 0 and 400 Hz with a lower cutoff frequency being less aggressive and having less impact on noise cancelling performance of the ANC system.

The particular classifier and classification process are a matter of design choice. In at least one embodiment, the noise components relationship classification and responsive signal processing system utilizes a neural network that is trained to classify the relationship between the ambient noise and the localized wind noise. In at least one embodiment, the output of the neural network is used to select the cutoff frequency of the high pass filter.

The type of classification value representing the relationship between the sound components is a matter of design choice and is, for example, a numeric, textual, or alphanumeric value representing the relationship. The representation of the classification values are also a matter of design choice. For example, the classification values can each represent an identifier that represents a particular relationship, such as a mathematical relationship, between sound component values, such as a ratio of volumes. Relative volumes of the acoustic noise components represent an exemplary relationship that may be classified by the classification technology. In at least one embodiment, the acoustic noise signal classification is selected from at least three classification values representing the relationship between the first and second sound components. In at least one embodiment, the relationship represents relative volumes of two sound signal components. The classification can modify processing of the sound signal to, for example, adjust a contribution of at least one of the sound components to the overall sound signal.

Figure 2:
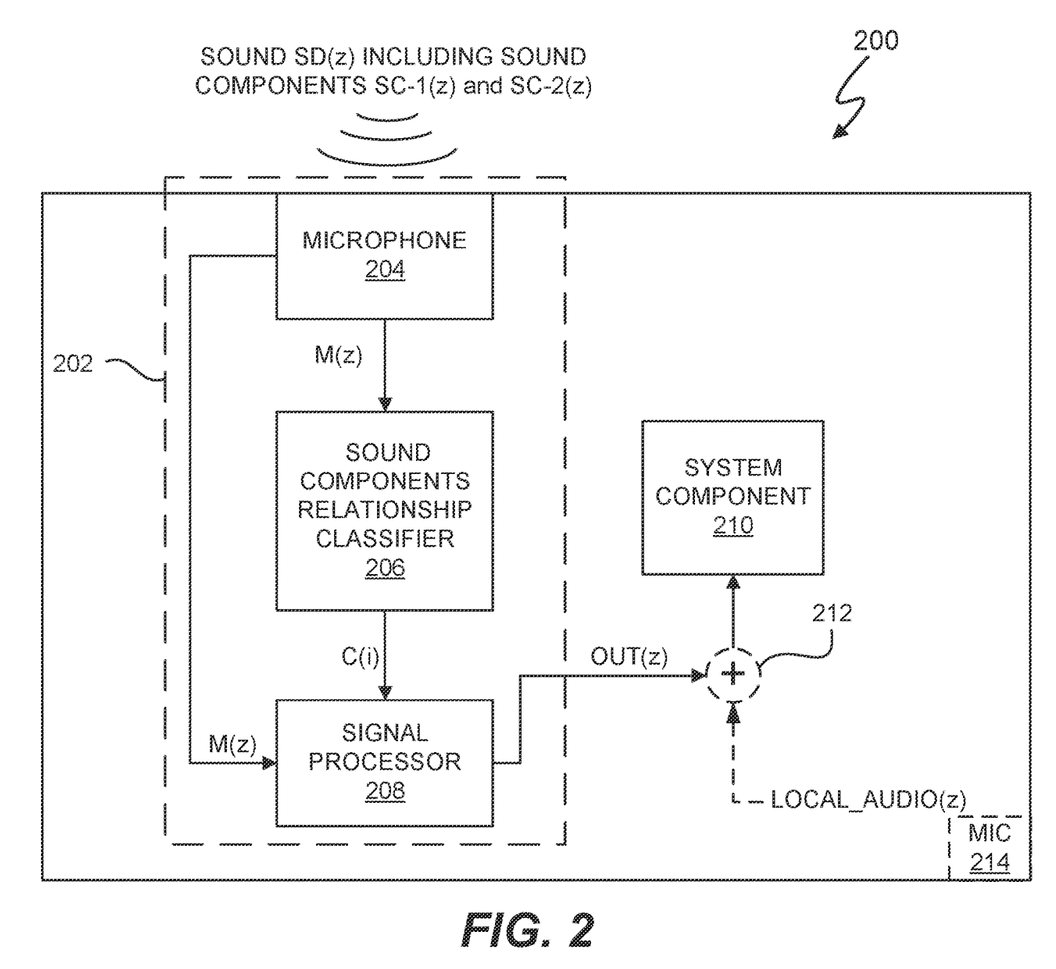
FIG. 2 depicts an exemplary electronic device that includes an acoustic system that classifies a relationship between at least two acoustic noise signal components.
Figure 3:
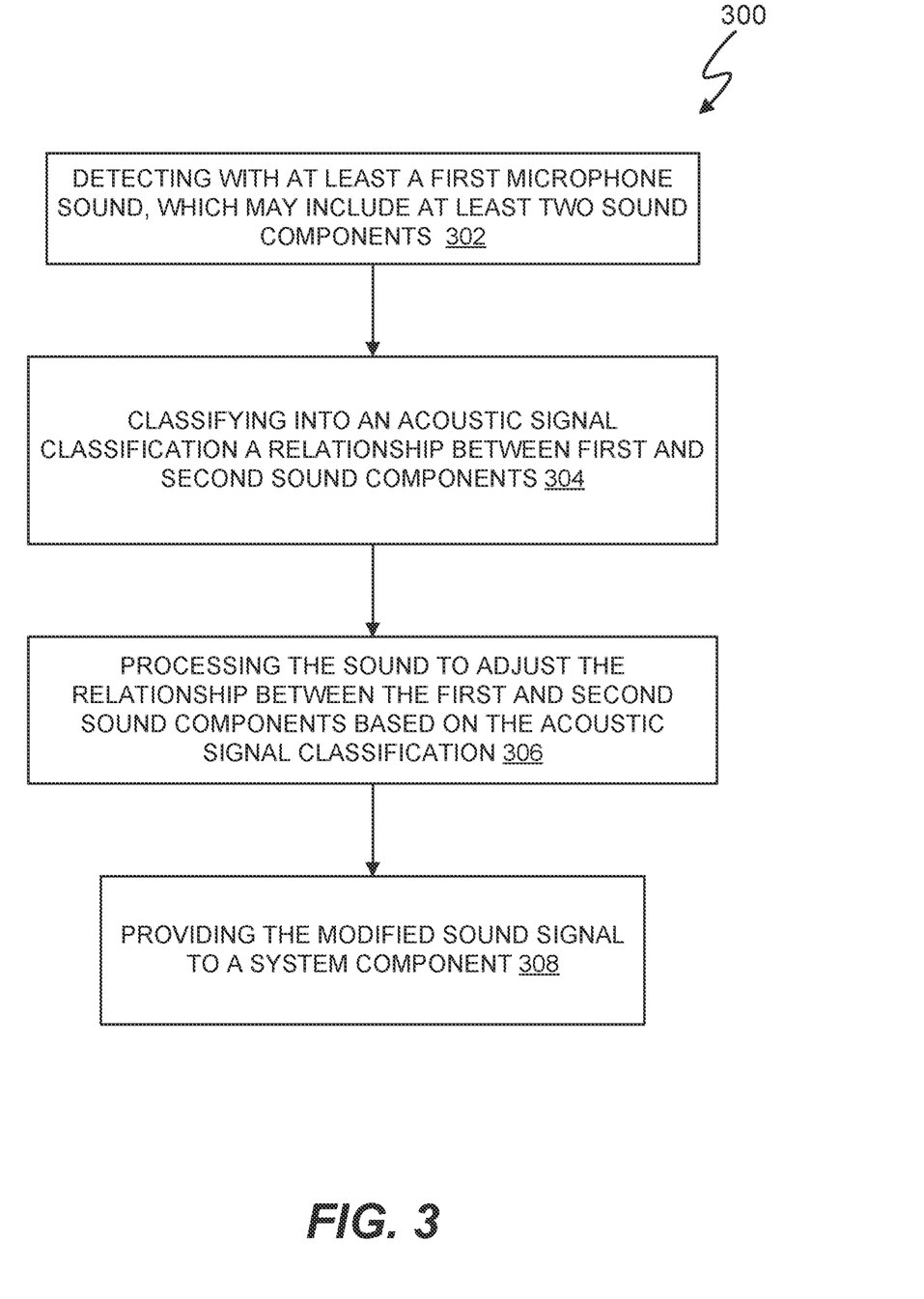
FIG. 3 depicts an exemplary acoustic noise processing and classification process for use by the acoustic system of FIG. 2.

FIG. 2 depicts an exemplary electronic device 200 that includes dynamic sound components relationship classification and responsive signal processing system 202 that classifies a relationship between at least two sound components $SC1(z)$ and $SC2(z)$ of a sound signal $SD(z)$ and responsively processes the sound signal $SD(z)$ including the sound components $SC1(z)$ and $SC2(z)$. The electronic device 200 may be any type of electronic device such as a mobile communication device, e.g. a mobile phone, or an audio recording device, such as a video camera or voice recorder. FIG. 3 depicts an exemplary dynamic sound components relationship classification and responsive signal process 300. In at least one embodiment, the system 202 operates in accordance with the process 300 to classify a relationship between at least sound components $SC-1(z)$ and $SC-2(z)$ and modify processing the sound signal $SD(z)$ in accordance with the classification.

Referring to FIGS. 2 and 3, in operation 302, microphone 204 receives the sound signal $SD(z)$ including the sound components $SC-1(z)$ and $SC-2(z)$ and converts the sounds signal $SD(z)$ into an electronic acoustic noise signal referred to as a microphone output signal $M(z)$. The sound components $SC-1(z)$ and $SC-2(z)$ may be any sound type. For example, in at least one embodiment, sound components $SC-1(z)$ and $SC-2(z)$ can be respectively ambient noise $A(z)$ and localized noise $LN(z)$. An exemplary type of localized noise $LN(z)$ is wind noise. The microphone 204 provides the microphone output signal to sound components relationship classifier 206. In operation 304, the classifier 206 classifies a relationship between the sound components $SC-1(z)$ and $SC-2(z)$ and provides a sound components relationship classification value corresponding to the relationship between sound components $SC-1(z)$ and $SC-2(z)$ as an input to the signal processor 208. In at least one embodiment, determination of the relationship assists the system 202 in modifying the relationship between the sound components $SC-1(z)$ and $SC-2(z)$ by, for example, modifying (either attenuating or amplifying) at least one of the sound components $SC-1(z)$ and $SC-2(z)$ processed by the signal processor 208. Filtering represents an exemplary modification to one or both of the sound components $SC-1(z)$ and $SC-2(z)$ using a filter with a dynamically adjustable cut off frequency. In at least one embodiment, sound component $SC-2(z)$ is a low frequency sound signal, such as a 0-400 Hz sound signal. In this embodiment, the filter is a high pass filter with a dynamically modifiable cut off frequency set by the determined sound components relationship classification value to selectively attenuate all, some, or none of the frequency components of the sound component $SC-2(z)$. In at least one embodiment, the signal processor 208 also or instead amplifies the other sound component $SC-1(z)$. The number of degrees of classification values of the relationship between the sound components $SC-1(z)$ and $SC-2(z)$ and number, degrees, and types of modification of the sound components $SC-1(z)$ and $SC-2(z)$, including attenuation and/or amplification, is a matter of design choice.

The particular type of relationship classification between the sound components $SC-1(z)$ and $SC-2(z)$ plus any other sound components of sound $SD(z)$ of interest is also a matter of design choice. In at least one embodiment, the classifier 206 determines classification values that represent relative volumes of the sound components $SC-1(z)$ and $SC-2(z)$. For example, in at least one embodiment, the classifier 206 processes the sound components $SC-1(z)$ and $SC-2(z)$ and selects one of N classification values, and each classification value represents a respective relationship between the sound components SC-1(z) and SC-2(z), where N is a positive integer greater than or equal to three. In at least one embodiment, each classification value also corresponds to a particular $i^{th}$ value of a dynamic sound signal, processing modification value C(i), where i is between 1 and N. The particular operation of signal processor 208 dynamically affected by the value C(i) is a matter of design choice. In at least one embodiment, the value of C(i) is an operating parameter, such as a cut off frequency value of a high pass filter signal processing operation or is mapped to a cut off frequency value.

In operation 306, the signal processor 208 processes the microphone output signal M(z) in accordance with the value C(i) to determine the output signal OUT(z) of the signal processor 208. As previously mentioned, the sound signal SD(z) can represent any of multiple noise components including sound components SC-1(z) and SC-2(z). When the sound signal represents only sound components SC-1(z) and SC-2(z), the microphone output signal M(z) equals SC-1(z)+SC-2(z). In at least one embodiment, the output signal OUT(z) of the signal processor 208 is a high pass filtered version of the microphone output signal M(z) filtered in accordance with a cut off frequency corresponding to the value C(i). In at least one embodiment, when the sound components SC-1(z) and SC-2(z) represent respective noise signals, the signal processor 208 includes a transfer function T(z) (not shown) that generates the output signal OUT(z) as an anti-noise signal.

The electronic device 200 also includes an optional audio source combiner 212 if the electronic device 200 combines a LOCAL_AUDIO(z) signal with the output signal OUT(z) of the signal processor 208. The LOCAL_AUDIO(z) signal includes, for example, external audio received by an optional microphone 214 or playback of a digital audio recording. In operation 308, the signal processor 208 provides the output signal OUT(z) of the signal processor 208 to the system component if the audio source combiner 212 is not present. If the audio source combiner 212 is present, the audio source combiner 212 provides the output signal OUT(z) plus the LOCAL_AUDIO(z) signal to the system component 210. The type of system component 210 is a matter of design choice. In at least one embodiment, the system component 210 is a speaker that converts the output signal OUT(z) plus the LOCAL_AUDIO(z) signal into sound or an audio connector that provides the output signal OUT(z) plus the LOCAL_AUDIO(z) signal to an external device (not shown), such as an external audio or audio/video system. In at least one embodiment, the system component 210 is a memory that stores the output signal OUT(z) plus the LOCAL_AUDIO(z) signal for later playback.

Figure 4:
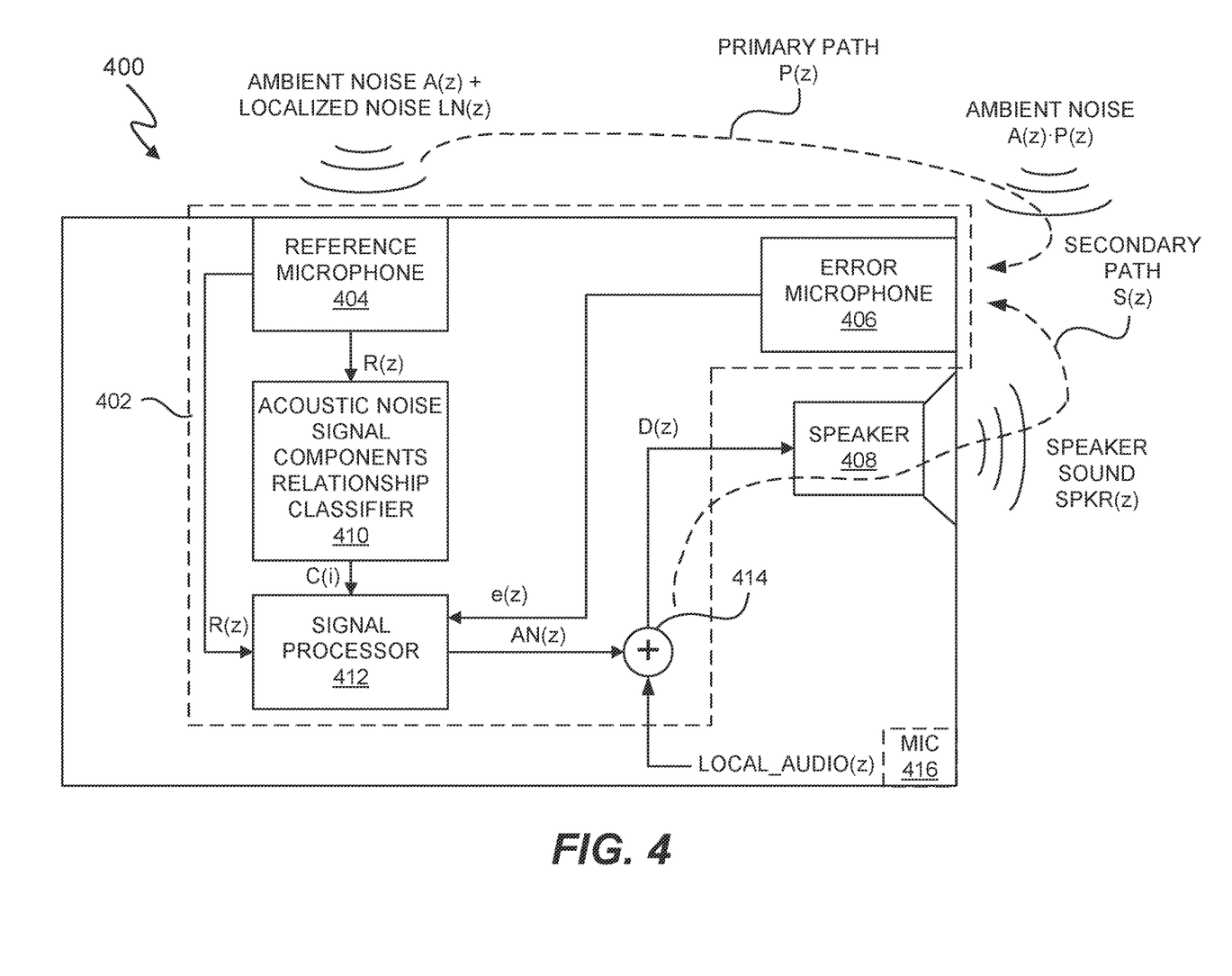
FIG. 4 depicts an exemplary electronic device that includes an active noise cancellation acoustic system.
Figure 5:
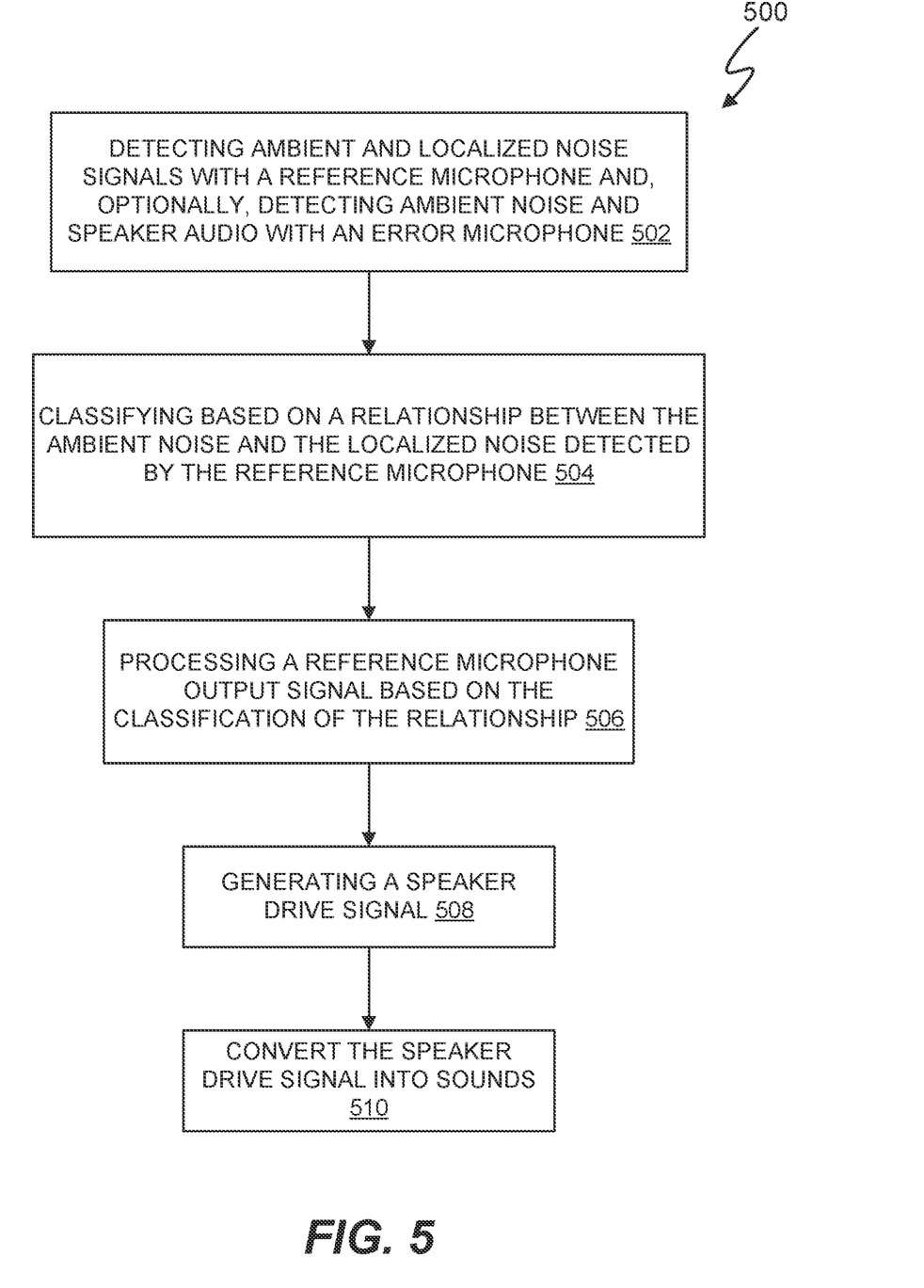
FIG. 5 depicts an exemplary ANC processing and classification process for use by the acoustic system of FIG. 4.

FIG. 4 depicts an exemplary electronic device 400 that represents one embodiment of the electronic device 200 (FIG. 2). The electronic device 400 includes an active noise cancellation acoustic system 402 ("ANC system 402"), and ambient noise A(z) and localized noise LN(z) respectively represent sound components SC-1(z) and SC-2(z). The ANC system 402 classifies a relationship between ambient noise A(z) plus localized noise LN(z) as detected by a reference microphone 404. When the ANC system 402 includes an optional error microphone 406, the error microphone 406 detects ambient noise A(z)·P(z). FIG. 5 depicts an exemplary ANC processing and classification process 500. In at least one embodiment, the ANC system 402 operates in accordance with the ANC processing and classification algorithm 500 to classify the relationship and improve performance of the ANC system 402.

Referring to FIGS. 4 and 5, in operation 502 reference microphone 404 detects the ambient noise A(z) and the localized noise LN(z). In at least one embodiment, the ambient noise A(z) is present along the primary path P(z) extending from the reference microphone 404 to the error microphone 406. Accordingly, the ambient noise A(z) is detected by the reference microphone 404 and detected as A(z)·P(z) at the error microphone 406. Relative to the location of the error microphone 406, the localized noise LN(z) is local to the reference microphone 404 and, thus, not heard by a user of the electronic device 400 and not detected or at least substantially not detected by the error microphone 406. Wind noise represents one embodiment of the localized noise LN(z).

In operation 502, the reference microphone 404 detects and converts the ambient noise A(z) and the localized noise LN(z) into an electrical reference microphone output signal R(z). When the ANC system 402 includes the optional error microphone 406, the error microphone 406 detects and converts sounds into an electrical error microphone output signal e(z). In at least one embodiment, the signal at the error microphone 406 is (LOCAL_AUDIO(z)·S(z))+AN(z)+A(z)·P(z). S(z) represents the transfer function of the secondary path, P(z) represents the transfer function of the primary path, and AN(z) represents an anti-noise signal subsequently discussed.

In operation 504, acoustic noise signal components classifier 410 ("classifier 410") classifies a relationship between the ambient noise A(z) and the localized noise LN(z) in the reference microphone output signal R(z). Determining the relationship allows the ANC system 402 to dynamically adjust processing parameters of signal processor 410 and modify the relationship between the ambient noise A(z) and the localized noise LN(z) by removing all or part of the localized noise localized noise LN(z) from the reference microphone output signal R(z).

The particular type of relationship to be classified between the ambient noise A(z) and localized noise LN(z) is a matter of design choice and, in at least one embodiment, is a classification of relative volumes of the ambient noise A(z) and localized noise LN(z). In at least one embodiment, the classifier 410 classifies the relationship between the ambient noise A(z) and localized noise LN(z) by processing the reference microphone output signal R(z) and determining a classification value that represents the relationship. For example and as illustratively described in more detail in conjunction with FIG. 6, the classifier 406 processes the reference microphone output signal R(z) and selects the $i^{th}$ classification value representing the relationship from N selectable classification values, where N is a positive integer greater than or equal to three and i is a member of a set $\{1,N\}$. Exemplary classification values representing the relative volumes of the ambient noise A(z) and localized noise LN(z) are subsequently discussed in more detail in conjunction with FIG. 9.

In at least one embodiment, each classification value of the relationship between ambient noise A(z) and localized noise LN(z) corresponds to a particular value of a signal processing value C(i) with the $i^{th}$ value being C(i). The particular operation of signal processor 412 affected by the dynamic value C(i) is a matter of design choice. In at least one embodiment, the signal processor 208 includes a high pass filter. In at least one embodiment, a range of control signals C(i), $i \in \{1,N\}$, represents various cut off frequency values that allow the ANC system 402 to dynamically set a high pass filter cut off frequency that, in at least one embodiment, optimizes performance of the ANC 402 by reducing or eliminating a contribution of the localized noise LN(z) to the reference microphone output signal R(z). For example, a frequency spectrum of the localized noise LN(z) such as wind noise generally lies primarily in the 0-400 Hz range. This frequency range is a relatively low frequency band compared to the human audible frequency response band of approximately 0-20 kHz. High pass filtering the reference microphone output signal R(z) in accordance with dynamic values of the cut off frequency of a high pass filter can effectively tailor attenuation of the localized noise LN(z) from the reference microphone output signal R(z) in accordance with more optimal operating parameters of the ANC system 402. In other words, varying the high pass filter cutoff frequency between 0-400 Hz in accordance with the classification of the relationship between the ambient noise A(z) and localized noise LN(z) may allow the signal processor 412 to remove all or part of the localized noise LN(z) and improve overall anti-noise performance of the ANC system 402. Accordingly, all or part of the localized noise LN(z) may be removed from the anti-noise signal AN(z), thus improving the performance of the ANC system 402 by tailoring the attenuation of the localized noise LN(z) to the relationship between the ambient noise N(z) and the localized noise LN(z).

In operation 506, the signal processor 412 processes the reference microphone output signal R(z) received from the reference microphone 404 in accordance with the value C(i) and processes the error signal e(z) to determine the anti-noise signal AN(z).

In operation 508, the audio source combiner 414 combines any LOCAL_AUDIO(z) signal with the anti-noise signal AN(z) to generate a speaker drive signal D(z). The speaker 408 converts the speaker drive signal D(z) into the speaker sound SPKR(z), which destructively interferes with the ambient noise A(z).

Figure 6:
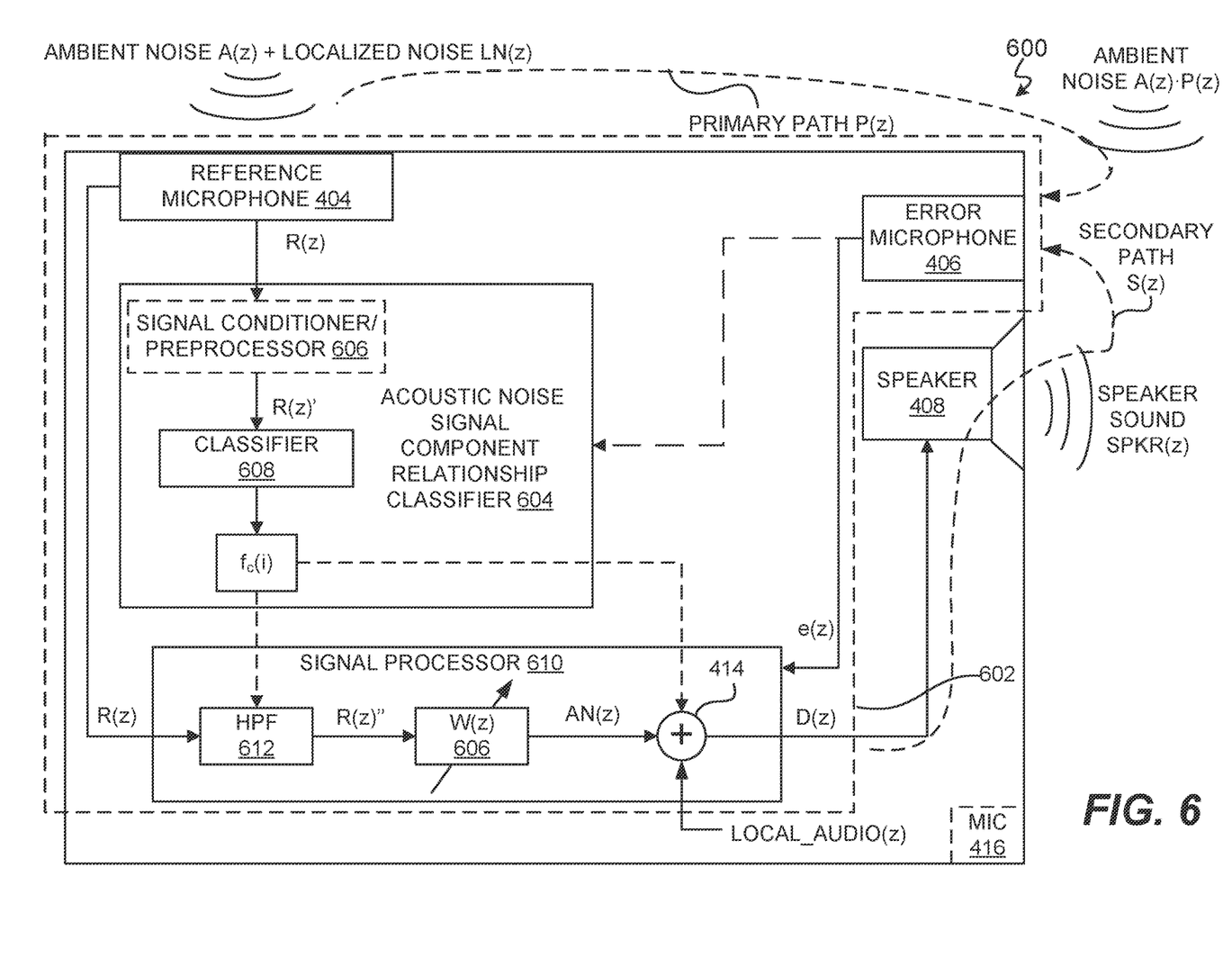
FIG. 6 depicts an exemplary electronic device that includes an active noise cancellation acoustic system.

FIG. 6 depicts an exemplary electronic device 600 that includes an active noise cancellation acoustic system 602 ("ANC system 602") that classifies a relationship between ambient noise A(z) plus localized noise LN(z) detected by the reference microphone 404 and ambient noise A(z)·P(z) detected by the error microphone 406. The electronic device 600 represents one embodiment of electronic device 400, and ANC system 602 represents one embodiment of ANC system 402. In at least one embodiment, ANC system 602 also operates in accordance with the exemplary ANC processing and classification algorithm 500 (FIG. 5) to classify the relationship between ambient noise A(z) plus localized noise LN(z) and improve performance of the ANC system 402. ANC system 602 depicts specific embodiments of acoustic noise signal component relationship classifier 604, which represents one embodiment of classifier 410 (FIG. 4). Optional (as indicated in dashed lines) signal conditioner/preprocessor 606 conditions and preprocesses the reference microphone output signal R(z) prior to processing by the classifier 608.

Figure 7:
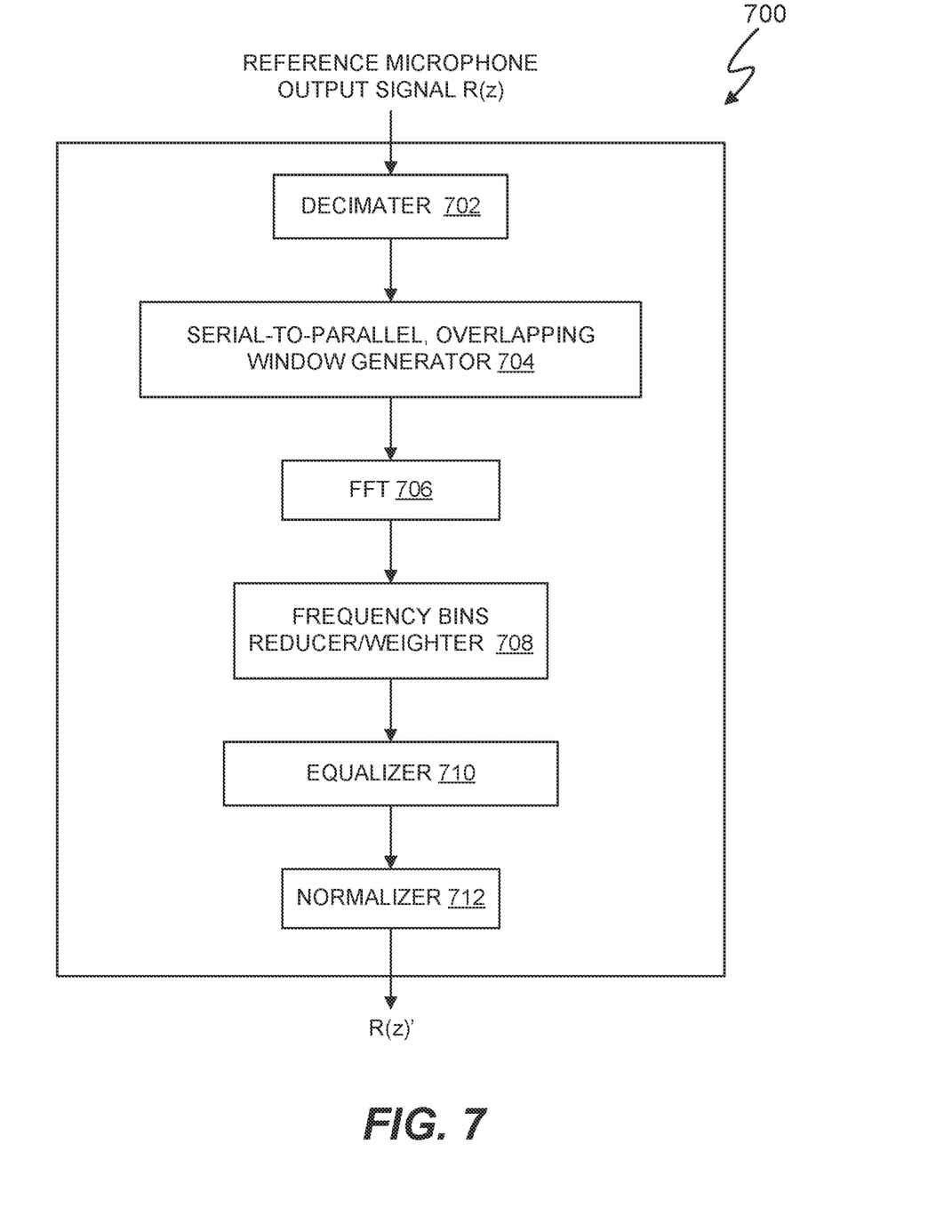
FIG. 7 depicts an exemplary signal conditioner/preprocessor.

FIG. 7 depicts exemplary signal conditioner/preprocessor 700, which represents one embodiment of signal conditioner/preprocessor 606. The signal conditioner/preprocessor 700 receives discrete sample values of the reference microphone output signal R(z) that are sampled at a frequency such as 48 kHz. Because the ambient noise A(z) and localized noise LN(z) are relatively low frequency sounds, such as below 2 kHz, signal conditioner/preprocessor 700 includes a decimator 702 to decimate the reference microphone output signal R(z) to a desired sampling rate from 48 kHz to between 2 kHz and 4 kHz. Generally, reference microphone output signal R(z) is initially serial data, so for subsequent processing, a serial-to-parallel overlapping window generator 704 converts the serial data into parallel data using overlapping windows. The parallel data grouped according to the windows allows the signal conditioner/preprocessor 700 to perform a frequency analysis on each window of reference microphone output signal R(z) data. In at least one embodiment, each window represents a particular time frame such as 1/50 second of sampled data, 1/30 second of sampled data, or a value in between 1/50 second and 1/30 second. The particular decimation sampling rate and window size are matters of design choice.

The fast Fourier transformer (FFT) 706 performs a fast Fourier transform on each window of data from the serial-to-parallel overlapping window generator 704 to determine the frequency components, which represent gain at identified frequency values, of the signal represented by the windowed reference microphone output signal R(z).

In at least one embodiment, the localized noise LN(z) may have particular predominant frequencies of interest. The frequency bins reducer/weight applicator 708 allows the signal conditioner/preprocessor 700 to accentuate particular frequencies of interest that correspond to frequency components of the localized noise LN(z) by weighting the particular frequency components of interest to emphasize frequencies of interest and/or deemphasizing frequencies of lesser or no particular interest. The particular frequencies of interest and weighting is a matter of design choice. In at least one embodiment, the particular frequencies of interest are determined empirically by frequency analyzing samples of the localized noise LN(z) of interest, such as sampling and analyzing wind noise. In at least one embodiment, the weights follow an exponential weighting profile corresponding to a typical wind noise frequency response.

In at least one embodiment, the equalizer 710 and the normalizer 712 facilitate utilizing the classifier 608 with different types of reference microphones and different volume levels of ambient noise A(z) and localized noise LN(z) without retraining the classifier 608. Different types and manufacturers of electronic devices 600 utilize different reference microphones, and the reference microphones between devices often have different frequency response characteristics. The equalizer 710 adjusts the frequency response of the processed reference microphone output signal R(z) to approximate a best fit to frequency responses of typical reference microphones.

Figure 8:
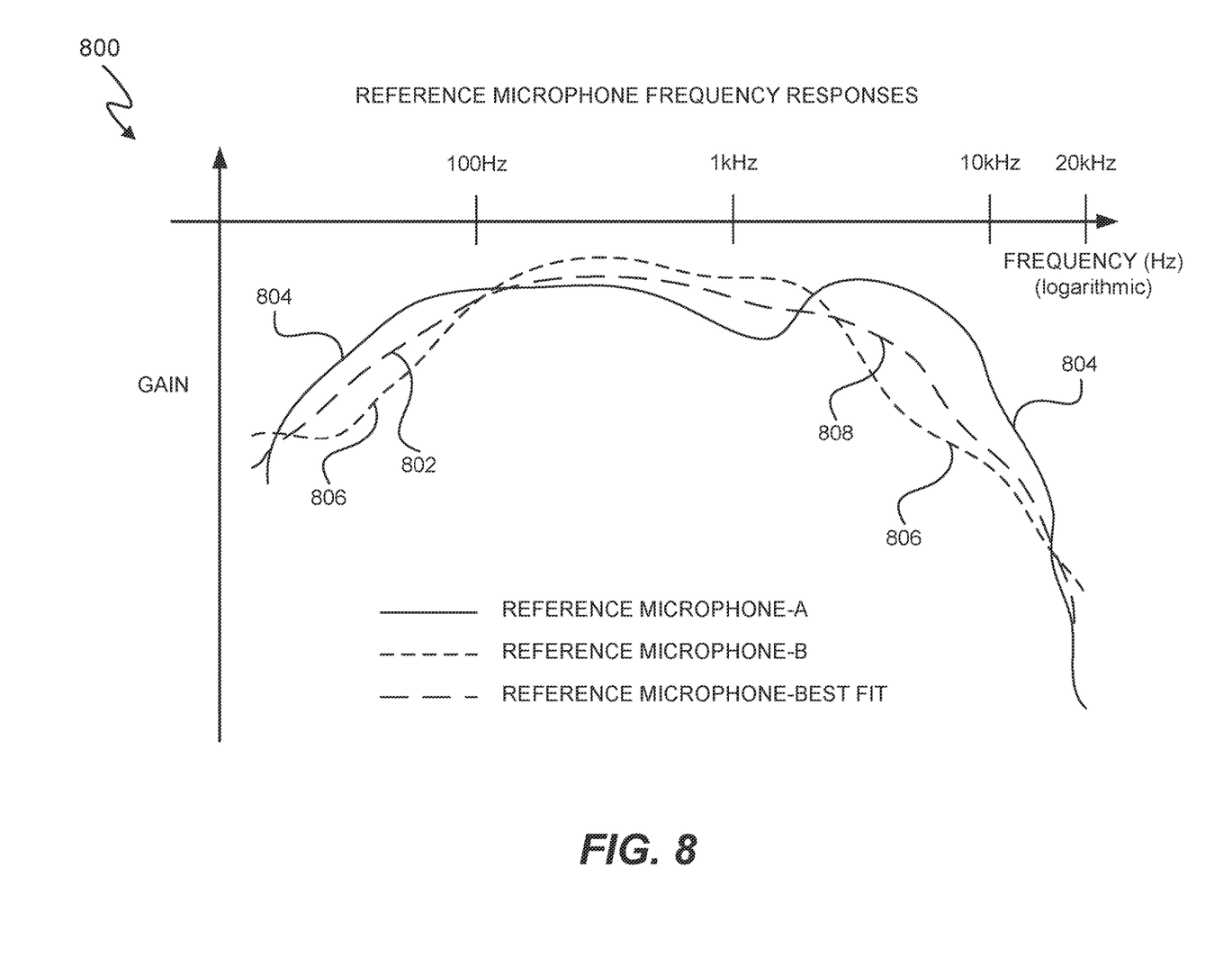
FIG. 8 depicts exemplary reference microphone frequency responses and a best fit frequency response approximation.

FIG. 8 depicts exemplary reference microphone frequency responses 800 and a best fit frequency response approximation. The reference microphone-best fit frequency response 802 approximates an average of the frequency responses 802 and 804 of respective reference microphones A and B. The equalizer 710 applies a response RESP(z) that makes a response MIC(z) of the reference microphone 406 match the reference microphone-best fit frequency response 802 (BEST_FIT(z)). In at least one embodiment, the applied response RESP(z)=−(MIC(z)−BEST_FIT(z)).

Referring to FIG. 7, normalizer 712 normalizes the equalized, processed reference microphone output signal R(z). In at least one embodiment, classifier 608 (FIG. 6) is a neural network that is trained using training data. An exemplary neural network 900 is subsequently discussed in more detail with reference to FIG. 9. Neural networks generally function more predictably and accurately when input data to the neural network closely approximates the training data. The normalizer 712 normalizes one or more characteristics of the equalized, processed reference microphone output signal R(z) to more closely match corresponding characteristics of the training data. For example, volume represents one characteristic of ambient noise A(z) and localized noise LN(z). The number of volume levels of the ambient noise A(z) and localized noise LN(z) is virtually infinite. However, the training data used to train the neural network may be limited to a finite number of volumes. Accordingly, the normalizer 712 normalizes the equalized, processed reference microphone output signal R(z) to limit the volumes to levels used by the training data. The output of the normalizer 712 and the signal conditioner/preprocessor 606 (FIG. 6) is the conditioned reference microphone output signal R(z)'.

Referring to FIG. 6, the classifier 608 receives the conditioned reference microphone output signal R(z)' and classifies a relationship between the ambient noise A(z) and reference microphone output signal R(z) as represented by the conditioned reference microphone output signal R(z)'. The particular type and implementation of classifier 608 is a matter of design choice. In at least one embodiment, the classifier 608 is a recursive neural network. In at least one embodiment, the classifier 608 is trained using samples of various combinations of the ambient noise A(z) mixed with localized noise LN(z) at various combinations of volume levels. In at least one embodiment, the training data varies the ambient noise A(z) and localized noise LN(z) each by four different volume levels of zero, low, medium, and high to create sixteen (4 P(z) volume levels×4 LN(z) volume levels) different combinations of ambient noise A(z) and localized noise LN(z). The classifier 608 classifies each of the combinations with one of N classification values.

Figure 9:
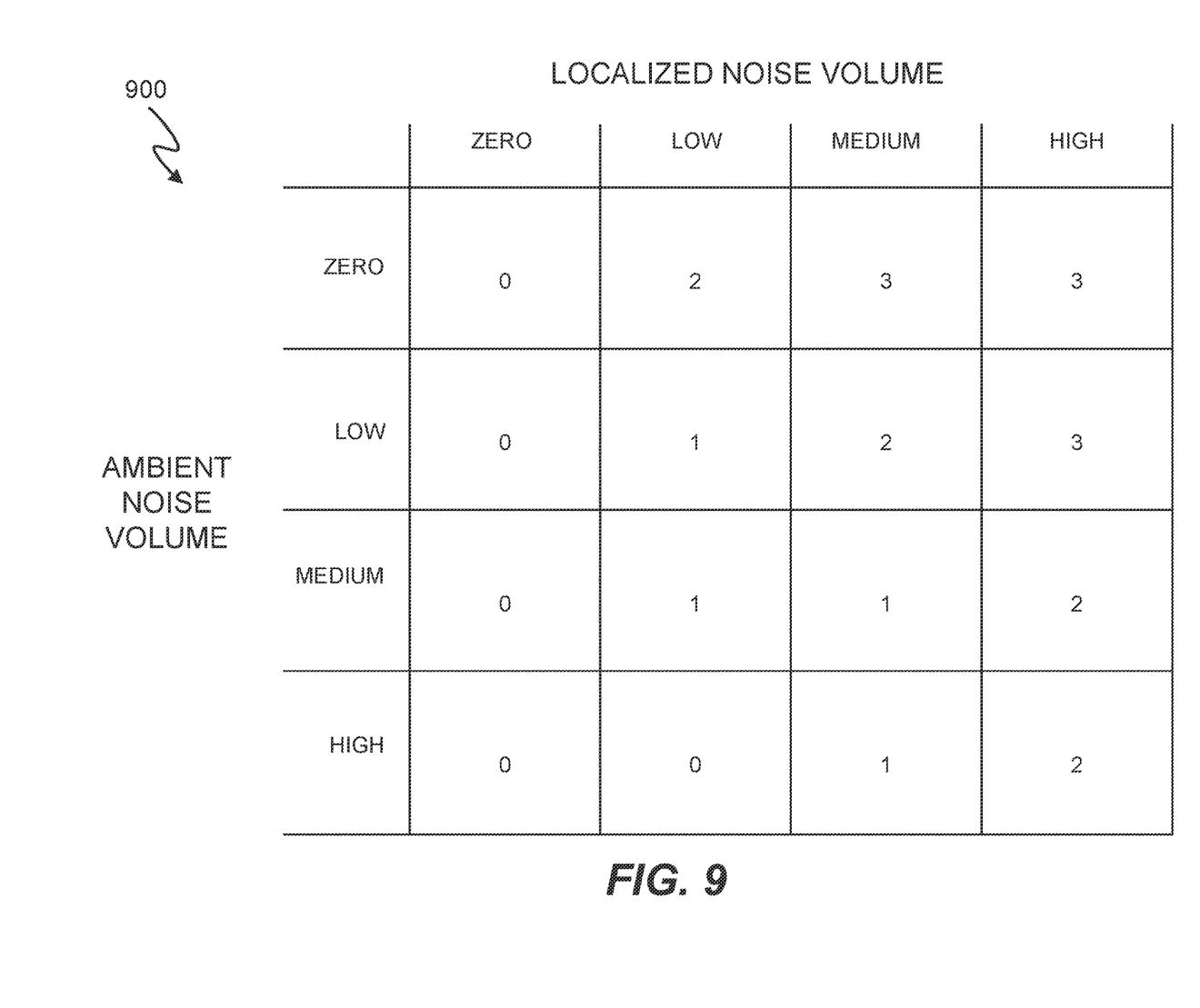
FIG. 9 depicts an exemplary ambient noise-localized noise relationship, classification value matrix.

FIG. 9 depicts an exemplary ambient noise A(z)-localized noise LN(z) relationship, classification value matrix 900 ("matrix 900"). Each cell of the matrix 900 contains a classification value representing a relationship between the ambient noise A(z) and the localized noise LN(z) based on relative volume. The dimensions of the matrix 900 and the range of classification values are matters of design choice. In the embodiment of the depicted matrix 900, the matrix is a 4×4 matrix with a range of 0-3 classification values. Each cell in the matrix 900 can be identified by row and column number. For example, cell (1,1) corresponds to the intersection of zero volume for ambient noise A(z) and zero volume for localized noise LN(z), cell (1,2) corresponds to zero volume for ambient noise A(z) and low volume for localized noise LN(z), and so on with cell (4,4) corresponding to high volume for ambient noise A(z) and high volume for localized noise LN(z). The classification values are the values located in each cell. For example, the classification value of cell (1,1) is 0, of cell (1,2) is 2, of cell (1,3) is 3, and so on.

Figure 10:
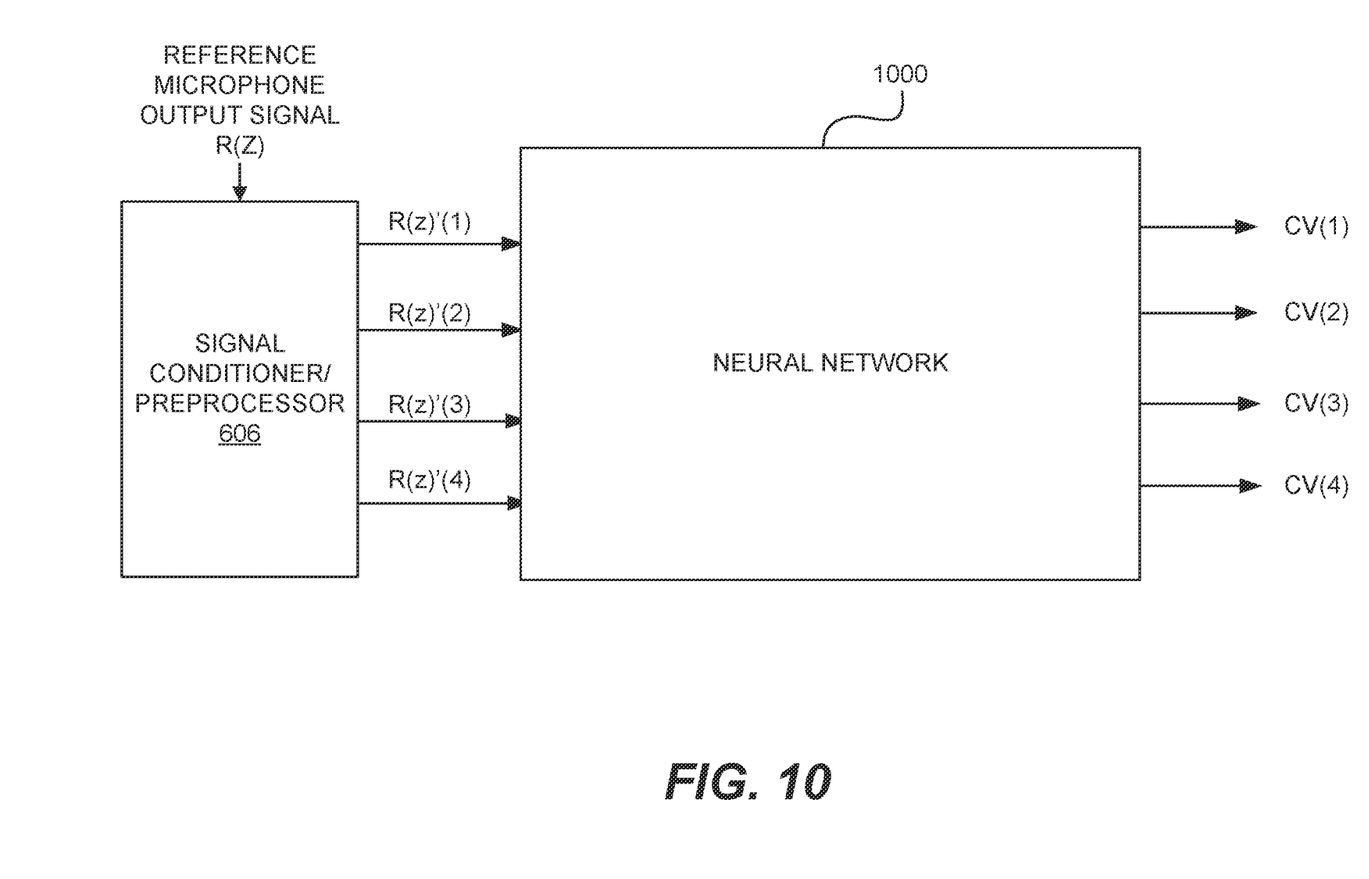
FIG. 10 depicts an exemplary recursive neural network ambient noise-localized noise relationship classifier.

FIG. 10 depicts a recursive neural network ambient noise-localized noise relationship classifier 1000 ("neural network 1000"), which represents one embodiment of classifier 608. The particular number of stages and nodes of the neural network 1000 are a matter of design choice. The neural network 1000 is utilized in one embodiment of the ANC system 602 because, for example, the relationships between ambient noise A(z) and localized noise LN(z) based on even a single parameter, such as volume, are potentially limitless. The neural network 1000 is trained to select a classification value of the relationship based on the training of the neural network 1000.

In at least one embodiment, to train the neural network, ambient noise A(z), localized noise LN(z), and combinations of ambient noise A(z) and localized noise LN(z), such as wind noise, at different volumes are recorded. Humans listen to the recorded sounds and classify the sounds between classification value (CV) of 0 ("CV(0)") and CV(3). The resultant classifications are then processed, such as by averaging, to determine representative classification values in the matrix 900. Table sets forth the mapping of classification values to human audibility:

TABLE 1

| Classification Value | Representative Human Audibility Level of localized noise LN(z), e.g. wind noise |
| --- | --- |
| CV(0) | Not Audible |
| CV(1) | Barely Audible |
| CV(2) | Audible |
| CV(3) | Very Audible |

Conditioning the reference microphone output signal R(z) with signal conditioner/preprocessor 606 allows the conditioned reference microphone output signal R'(z) to more closely approximate the training data and allow the neural network 1000 to more accurately classify the reference microphone output signal R(z). The neural network 1000 processes values of the conditioned reference microphone output signal R'(z) values of the conditioned reference microphone output signal R'(z) to determine a classification value. In the embodiment of Figure the neural network 1000 processes four values of the conditioned reference microphone output signal R'(z) in parallel, i.e. R(z)'(1), R(z)'(2), R(z)'(3), and R(z)'(4). The particular number of values of the conditioned reference microphone output signal R'(z) processed at one time by the neural network 1000 is a matter of design choice. The neural network 1000 selects one of four classification values (CV), CV(1), CV(2), CV(3), and CV(4), based on the input values. In at least one embodiment, CV(1) equals 0, CV(2) equals 1, CV(3) equals 2, and CV(4) equals 3, which corresponds to the possible classification values in the ambient noise A(z)-to-localized noise LN(z) relationship, classification value matrix 900.

Referring to FIGS. 9 and 10, in an exemplary operation of neural network 1000 and in conjunction with the matrix 900, neural network is trained so that when the values of R(z)'(1), R (z)'(2), R(z)'(3), and R(z)'(4) represent zero ambient noise A(z) volume and zero localized noise LN(z) volume, which corresponds to cell (1,0) of matrix 900, the neural network 1000 selects CV(1). When the values of R(z)'(1), R (z)'(2), R(z)'(3), and R(z)'(4) represent low ambient noise A(z) volume and zero localized noise LN(z) volume, which corresponds to cell (2,0) of matrix 900, the neural network 1000 also selects CV(1). When the values of R(z)' (1), R (z)'(2), R(z)'(3), and R(z)'(4) represent low ambient noise A(z) volume and high localized noise LN(z) volume, which corresponds to cell (2,4) of matrix 900, the neural network 1000 selects CV(4), and so on.

Referring to FIGS. 6 and 9, each classification value also maps to an operating parameter of the signal processor 610. In at least one embodiment, each classification value also maps to a cutoff frequency f c of the filter 612 of signal processor 610. In at least one embodiment, the localized noise LN(z) is wind noise, which has a generally low frequency of range of 0-400 Hz. As previously discussed with reference to ANC system 402, classifier 608 dynamically modifies the high pass filter cut off frequency f c of the filter 612 to improve ANC system 602 performance depending on the relationship between the ambient noise A(z) and localized noise LN(z). Table 2 sets forth an exemplary mapping between (1) classification values of the relationship between ambient noise A(z) and localized noise LN(z) and (2) the high pass filter cut off frequency $f_c$:

TABLE 2

| Classification Value | Cutoff Frequency fc(i) |
|---|---|
| CV(0) | $f_c(0)$ = 0 Hz (All Pass) |
| CV(1) | $f_c(1)$ = 100 Hz |
| CV(2) | $f_c(2)$ = 200 Hz |
| CV(3) | $f_c(3)$ = 400 Hz |

Referring to FIG. 6, classifier 608 maps each determined classification value representing the relationship between the ambient noise A(z) and localized noise LN(z) to a cutoff frequency $f_c(i)$ in accordance with Table 2. High pass filter (HPF) then processes the reference microphone output signal R(z) in accordance with the cutoff frequency $f_c(i)$ determined by the classifier 608 to generate filtered reference microphone output signal R(z)". For example, referring to FIG. 9 and Table 2, if the classifier 608 determines that the relationship between the ambient noise A(z) and localized noise LN(z) volumes is zero-zero in matrix 900, classifier 608 classifies the relationship with classification value CV(0), which corresponds to 0 Hz or all pass. Accordingly, HPF 612 processes reference microphone output signal R(z) such that R(z)" equals R(z). If the classifier 608 determines that the relationship between the ambient noise A(z) and localized noise LN(z) volumes is medium-medium in matrix 900, classifier 608 classifies the relationship with classification value CV(1), which corresponds to 100 Hz.

Accordingly, HPF 612 processes reference microphone output signal R(z) to generate R(z)" that represents suppression of all frequency components in R(z) below 100 Hz. If the classifier 608 determines that the relationship between the ambient noise A(z) and localized noise LN(z) volumes is low-high in matrix 900, classifier 608 classifies the relationship with classification value CV(3), which corresponds to 400 Hz. In this instance, HPF 612 processes reference microphone output signal R(z) to generate R(z)" that represents suppression of all frequency components in R(z) below 400 Hz and so on. The particular location of HPF 612 in ANC system 602 is a matter of design choice. In at least one embodiment (not shown), HPF 612 is relocated to the output of active filter 606.

Active filter 606 processes the filtered reference microphone output signal R(z)" with a transfer function of W(z), which in one embodiment equals −P(z)/S(z), to generate the anti-noise signal AN(z). Combiner 414 combines the anti-noise signal AN(z) with any LOCAL_AUDIO(z) signal to generate the speaker drive signal D(z), and speaker 408 converts the speaker drive signal D(z) into the speaker sound SPKR(z) as previously described.

The elements and processes of embodiments of electronic devices 200, 400, and 600 may be implemented in, for example, a single integrated circuit, multiple integrated circuits and/or combinations of a processor executing firmware and/or other types of software code stored in a non-transitory memory. The acoustic signal processing system may process values represented as either or both continuous time domain signals and discrete time domain signals.

Thus, an acoustic signal processing system and method includes classification technology to classify a relationship between at least two sound components of a received sound signal. The sound components may be any type of sound, such as ambient noise and localized noise, such as wind noise. The classification technology dynamically determines a classification value that represents the relationship between the sound components and processes the sound signal in accordance with the acoustic signal classification to modify the sound signal. In at least one embodiment, dynamic classification of the relationship between sound components in a sound signal and responsive signal processing improve performance of systems, such as an active noise cancellation (ANC) system, by, for example, attenuating at least one of the sound components and/or enhancing at least one of the sound components. In an ANC system context, the sound components generally include noise components such as ambient noise and noise localized to a microphone.

Although embodiments have been described in detail, it should be understood that various changes, substitutions, and alterations can be made hereto without departing from the spirit and scope of the invention as defined by the appended claims.

What is claimed is:

1. A method for classifying noise and responsive signal processing in an acoustic signal processing system of an acoustic system, the method comprising:
   receiving a first sound signal from a first microphone, wherein:
      the first sound signal includes a first noise sound component and a second noise sound component;
      the first noise sound component is localized noise; and
      the second noise sound component is ambient noise;
   classifying, into an acoustic signal classification, a relationship between the first and second noise sound components, wherein the acoustic signal classification is selected from at least three classification values representing the relationship between the first and second noise sound components;
   processing the first sound signal in accordance with the acoustic signal classification to modify the received first sound signal using a transfer function that increases attenuation of the localized noise when the localized noise is classified as increasing relative to the ambient noise and decreases attenuation of the localized noise when the localized noise is classified as decreasing relative to the ambient noise, wherein the only sound signal processed to classify the localized noise is the first sound signal received from the first microphone;
   generating an anti-noise signal using the processed first sound signal and the transfer function; and
   providing at least the anti-noise signal to a speaker.

2. The method of claim 1 wherein the localized noise is wind noise.

3. The method of claim 1 wherein processing the first sound signal in accordance with the acoustic signal classification to modify the received first sound signal comprises:
   dynamically modifying a frequency response of the acoustic signal processing system to operate in a mode corresponding to the acoustic signal classification selected.

4. The method of claim 3 wherein:
   the first microphone is a reference microphone; and
   dynamically modifying a frequency response of the acoustic signal processing system to operate in a mode corresponding to the acoustic signal classification selected further comprises:
      converting the acoustic signal classification into a high pass filter cutoff frequency parameter that corresponds to the acoustic signal classification;
      and filtering the reference microphone output signal with the high pass filter in accordance with the high pass filter cutoff frequency parameter.

5. The method of claim 1 wherein processing the first sound signal in accordance with the acoustic signal classification to modify the received first sound signal further comprises:
generating a speaker drive signal based on the processed the first sound signal.

6. The method of claim 1 further comprising:
receiving the first and second sound components of the first sound signal from the first microphone, wherein the first sound signal detected by the first microphone represents a reference signal;
receiving a second sound signal from a second microphone, wherein the second sound signal represents an error signal and:
generating the anti-noise signal comprises generating the anti-noise signal using the reference signal, the error signal, the processed first sound signal, and the transfer function; and
providing at least the anti-noise signal to the speaker.

7. The method of claim 6 wherein:
the acoustic system comprises a headset;
the first microphone comprises a reference microphone located outside an ear housing of the headset; and
the second microphone comprises an error microphone located on an inside portion of the ear housing of the headset.

8. The method of claim 1 wherein processing the first sound signal in accordance with the acoustic signal classification to modify the received first sound signal comprises:
adjusting a contribution of at least the second sound component to the first sound signal.

9. The method of claim 1 wherein providing the processed first sound signal to the speaker further comprises:
generating a speaker drive signal based on the classification of the relationship between the first and second sound components.

10. The method of claim 1 wherein the first and second components of the first sound signal are noise, and the acoustic signal processing system comprises an active noise cancellation system.

11. The method of claim 1 wherein the acoustic signal classification values represent a combination of contributions of volumes of the two sound components, the method further comprising:
mapping the acoustic signal classification value to a high pass filter cut off frequency; and
filtering the received acoustic signal with a high pass filter to attenuate the first sound component in accordance with the high pass filter cut off frequency.

12. The method of claim 11 wherein the contributions of volumes of the two sound components comprise a volume of ambient noise signal and a volume of wind noise.

13. The method of claim 1 wherein classifying the relationship between the first and second sound components comprises:
determining a closest match between the relationship of the first and second sound components and one of the classification values, wherein the closest matching classification value classifies the relationship between the detected first and second sound components.

14. The method of claim 1 wherein the acoustic system comprises a mobile communication device.

15. The method of claim 1 wherein classifying into an acoustic signal classification comprises:
processing at least a representation of the first sound signal with a neural network; and
determining the acoustic signal classification with the neural network.

16. The method of claim 15 wherein classifying into an acoustic signal classification comprises:
conditioning the first sound signal into a conditioned first sound signal prior to processing the detected first sound signal with the neural network.

17. The method of claim 15 wherein the neural network is trained with sound signal training data, and conditioning the first sound signal into a conditioned first sound signal comprises:
adjusting the first sound signal into neural network input data to approximate a frequency response of corresponding sound signal training data.

18. The method of claim 17 wherein adjusting the first sound signal into neural network input data to approximate a frequency response of corresponding sound signal training data comprises:
equalizing the first sound signal in accordance with one or more frequency responses of one or more microphones used to generate the sound training data; and
normalizing the equalized first sound signal with volume levels of sound signals used to generate the sound training data.

19. The method of claim 1 wherein the only sound signal used in generating the anti-noise signal is the first sound signal.

20. An apparatus comprising:
a first microphone to receive a first sound signal, wherein:
the first sound signal includes a first noise sound component and a second noise sound component;
the first noise sound component is localized noise; and
the second noise sound component is ambient noise;
a classifier, coupled to the input, to classify, into an acoustic signal classification, a relationship between the first and second noise sound components, wherein the acoustic signal classification is selected from at least three classification values representing the relationship between the first and second noise sound components;
a signal processor, coupled to the classifier, to:
process the first sound signal in accordance with the acoustic signal classification to modify the received first sound signal using a transfer function that increases attenuation of the localized noise when the localized noise is classified as increasing relative to the ambient noise and decreases attenuation of the localized noise when the localized noise is classified as decreasing relative to the ambient noise, wherein the only sound signal processed to classify the localized noise is the first sound signal received from the first microphone; and
generate an anti-noise signal using the processed first sound signal and the transfer function; and
an output, coupled to the signal processor, to provide at least the anti-noise signal to a speaker.

21. The system of claim 20 wherein the localized noise is wind noise.

22. The system of claim 20 wherein to process the first sound signal in accordance with the acoustic signal classification to modify the detected first sound signal, the signal processor is further configured to:
dynamically modify a frequency response of the acoustic signal processing system to operate in a mode corresponding to the acoustic signal classification selected of the relationship between the first and second sound components.

23. The system of claim 22 wherein to dynamically modify a frequency response of the acoustic signal processing system to operate in a mode corresponding to the acoustic signal classification selected, the signal processor is further configured to:
convert the acoustic signal classification into a high pass filter cutoff frequency parameter that corresponds to the acoustic signal classification; and
to filter the first sound signal with a high pass filter in accordance with the high pass filter cutoff frequency parameter.

24. The system of claim 20 wherein to process the first sound signal in accordance with the acoustic signal classification to modify the received first sound signal, the signal processor is further configured to:
generate a speaker drive signal based on the processed first sound signal.

25. The system of claim 20 wherein the first microphone is a reference microphone.

26. The system of claim 25 further comprising:
a second microphone to receive an error signal;
wherein the signal processor is further configured to generate at least the anti-noise signal using the reference signal, the error signal, the processed first sound signal, and the transfer function; and
a speaker, coupled to the signal processor, to receive at least the anti-noise signal and generate sound that corresponds to at least the anti-noise signal.

27. The system of claim 20 wherein to process the first sound signal in accordance with the acoustic signal classification to modify the received first sound signal comprises:
to adjust a contribution of at least the second sound component to the received first sound signal.

28. The system of claim 20 wherein to provide the processed first sound signal to a device further comprises:
to generate a speaker drive signal based on the classification of the relationship between the first and second sound components.

29. The system of claim 20 wherein the classifier and the signal processor comprise an active noise cancellation system.

30. The system of claim 20 wherein the acoustic signal classification values represent a combination of contributions of volumes of the two sound components, wherein the classifier is further configured to map the acoustic signal classification value to a high pass filter cut off frequency, wherein:
the signal processor further includes a high pass filter to filter the received acoustic signal to attenuate the first sound component in accordance with the high pass filter cut off frequency.

31. The system of claim 30 wherein the contributions of volumes of the two sound components comprise a volume of ambient noise signal and a volume of wind noise.

32. The system of claim 20 wherein to classify the relationship between the first and second sound components, the classifier is further configured to:
determine a closest match between the detected first and second sound components and one of the classification values, wherein the closest matching classification value classifies the relationship between the detected first and second sound components.

33. The system of claim 20 wherein the acoustic system comprises one of a mobile communication device and a headset.

34. The system of claim 20 wherein to classify into an acoustic signal classification, the classifier is further configured to:
the classifier includes a neural network to:
process at least a representation of the first sound signal; and
determine the acoustic signal classification.

35. The system of claim 34 wherein the neural network is trained with sound signal training data, and to condition the first sound signal into a conditioned first sound signal, the classifier is further configured to:
adjust the first sound signal into neural network input data to approximate a frequency response of corresponding sound signal training data.

36. The system of claim 35 wherein to adjust the first sound signal into neural network input data to approximate a frequency response of corresponding first sound signal training data, the classifier further includes a signal conditioner to:
equalize the first sound signal in accordance with one or more frequency responses of one or more microphones used to generate the sound training data; and
normalize the equalized first sound signal with volume levels of sound signals used to generate the sound training data.

37. The apparatus of claim 20 wherein the only sound signal used to generate the anti-noise signal is the first sound signal.

38. A mobile communication device comprising:
a microphone to receive a first sound signal, wherein:
the first sound signal includes a first noise sound component and a second noise sound component;
the first noise sound component is localized noise; and
the second noise sound component is ambient noise;
an active noise cancellation system, coupled to the microphone, comprising:
a classifier to classify, into an acoustic signal classification, a relationship between the first and second sound components, wherein the acoustic signal classification is selected from at least three classification values representing the relationship between the first and second sound components;
a signal processor, coupled to the classifier, to process the first sound signal in accordance with the acoustic signal classification to;
modify the detected first sound signal using a transfer function that increases attenuation of the localized noise when the localized noise is classified as increasing relative to the ambient noise and decreases attenuation of the localized noise when the localized noise is classified as decreasing relative to the ambient noise, wherein the only sound signal processed to classify the localized noise is the first sound signal received from the first microphone; and
generate an anti-noise signal using the processed first sound signal and the transfer function; and
a speaker, coupled to the active noise cancellation system, to receive the anti-noise signal and generate sound that corresponds to at least the anti-noise signal.

39. The mobile communication device of claim 38 wherein the only sound signal used to generate the anti-noise signal is the first sound signal.

* * * * *